United States Patent [19]

Condne et al.

[11] Patent Number: 5,068,793
[45] Date of Patent: Nov. 26, 1991

[54] APPARATUS FOR TRIGGERING PASSENGER PROTECTION SYSTEMS

[75] Inventors: Claus Condne, Wadgassen; Bernhard Mattes, Sachsenheim; Dieter Schmalz, Pleidelsheim, all of Fed. Rep. of Germany

[73] Assignee: Robert Bosch GmbH, Stuttgart, Fed. Rep. of Germany

[21] Appl. No.: 276,319

[22] PCT Filed: Feb. 28, 1987

[86] PCT No.: PCT/DE87/00078
§ 371 Date: Oct. 6, 1988
§ 102(e) Date: Oct. 6, 1988

[87] PCT Pub. No.: WO88/00146
PCT Pub. Date: Jan. 14, 1988

[30] Foreign Application Priority Data
Jun. 27, 1986 [DE] Fed. Rep. of Germany ....... 3621580

[51] Int. Cl.$^5$ .............................................. B60R 21/32
[52] U.S. Cl. ............................. 364/424.05; 180/271; 280/735
[58] Field of Search ....................... 280/801, 735, 748; 180/282, 268, 271, 282; 364/424.01, 424.05; 340/669

[56] References Cited

U.S. PATENT DOCUMENTS

| 4,021,057 | 5/1977 | Held et al. | 280/735 |
| 4,164,263 | 8/1979 | Heintz et al. | 180/268 |
| 4,410,875 | 10/1983 | Spies et al. | 340/669 |
| 4,608,501 | 8/1986 | Andres et al. | 180/271 |
| 4,620,721 | 11/1986 | Scholz et al. | 180/268 |
| 4,784,237 | 11/1988 | Condne et al. | 180/268 |

Primary Examiner—Gary Chin
Attorney, Agent, or Firm—Michael J. Striker

[57] ABSTRACT

The invention is directed to an apparatus for triggering passenger protection systems particularly restraining systems in vehicles during their impact. In the previous systems, there is the disadvantage that the protective systems are only triggered late or not at all during critical impact situations at relatively low negative accelerations. The disadvantage chiefly results because a differential signal is fed to the input of an integrator which comprises the difference between a signal derived from the acceleration and a constant threshold value signal. According to the invention, a variable threshold value is deducted from the derived acceleration signal rather than a constant threshold value.

7 Claims, 2 Drawing Sheets

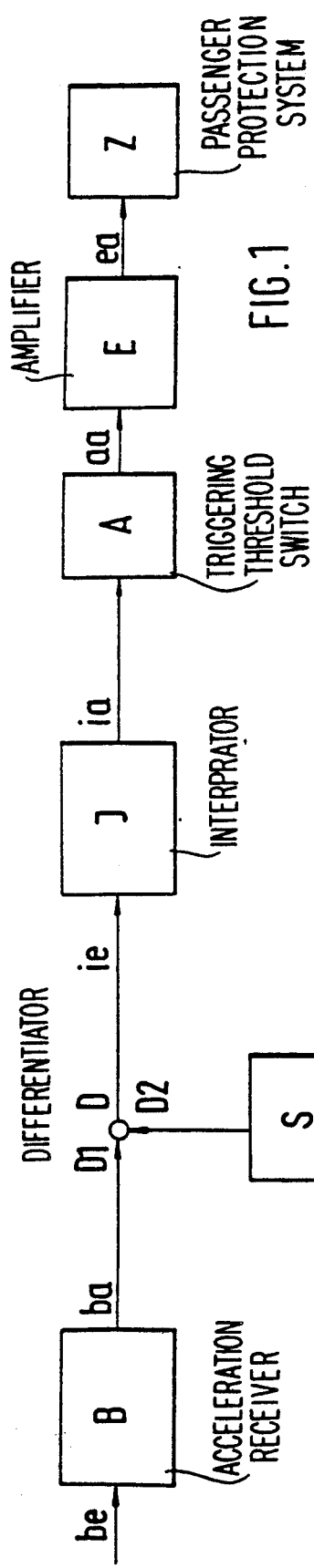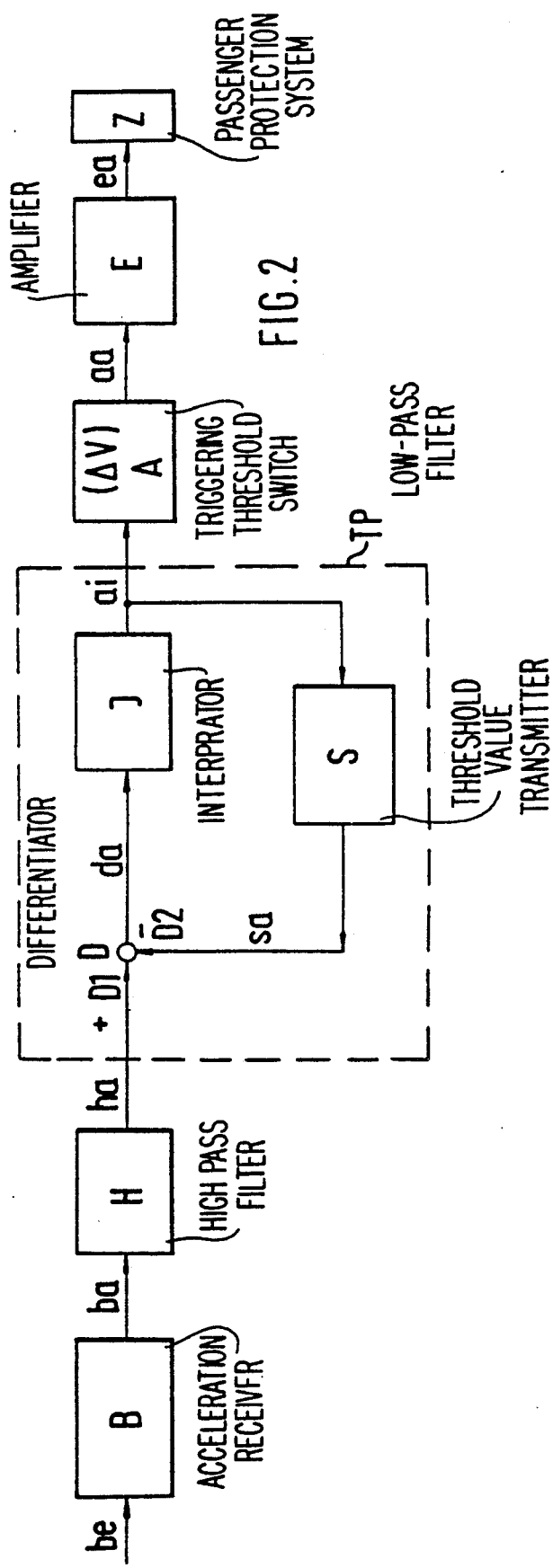

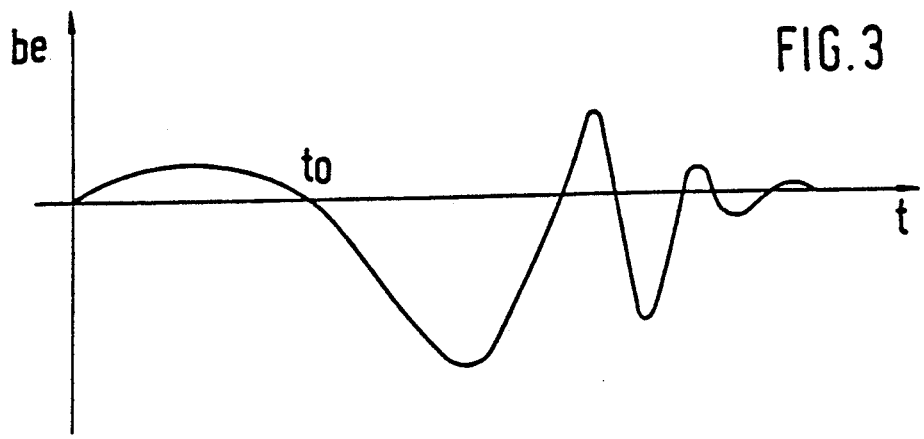
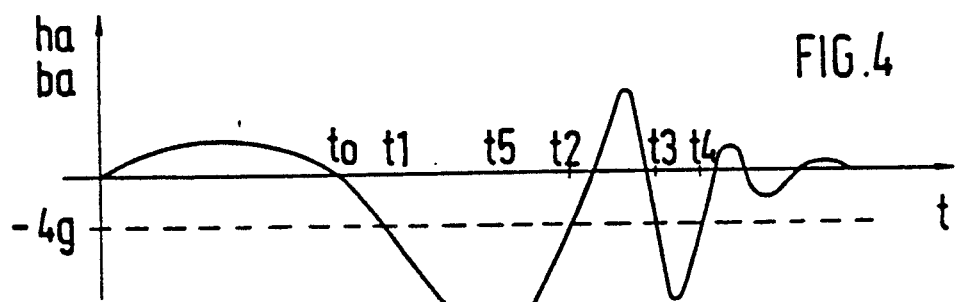
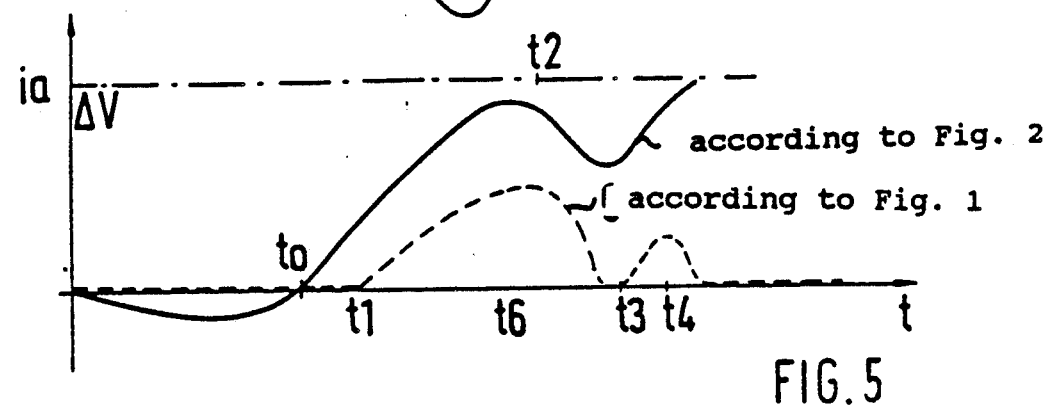

APPARATUS FOR TRIGGERING PASSENGER PROTECTION SYSTEMS

BACKGROUND OF THE INVENTION

The present invention relates to an apparatus for triggering passenger protection systems, particularly restraining systems in vehicles on at impact. Such systems are known e.g. from the DE-PS 26 12 215. The triggering of such systems at the appropriate point in time presents certain difficulties. On one hand, because the rapidity of the sequences of movement, the sensitivity of the sensor must be great enough so that, e.g. during an impact at 50 km/hour, the registering of the impact, as well as the safety measure itself, such as tightening of the straps or blowing up of cushions, must be completed within 40 ms. On the other hand, triggering may not be effected for obvious reasons when criteria which only resemble an impact are present at the sensor, as can occur, for example, when driving over an obstacle or even during normal braking of the vehicle. Moreover, it must be taken into account that below an acceleration of approximately—4g the passengers can support themselves without additional restraining measures, i.e. the triggering of safety device can result in increased risk in this event, resulting in the opposite of the intended purpose. It has been shown that a dangerous impact situation is characterized above all in that the polarity of the acceleration does not change over a distinctly longer period of time in contrast to intensive short-term accelerations, as occur e.g. when driving over a curb or also as a result of a blow by a hammer. The acceleration changes repeatedly within a very short period of time.

In order to separate critical impact situations from uncritical impact situations in an improved manner, it is known, e.g. from the US-PS 37 01 903, to provide an amplitude limiter, an integrator, and a threshold circuit in addition to the acceleration receiver. It is the object of the amplitude limiter to limit upwardly the amplitude of an impact, so that the following integrator reaches the threshold voltage of the threshold value switch, which is connected downstream, only during impacts at intense, more sustained accelerations. If the amplitude of impacts is too small, i.e. if it lies below the level fixed by the amplitude limiter, no output signal appears at the input of the integrator. In addition, the integrator causes the triggering voltage for the threshold value switch connected downstream to be reached only after the expiration of a predetermined period of time.

A disadvantage of the previously known systems consists in that they do not trigger or trigger late at low accelerations such as occur e.g. during oblique impact.

Instead of using an amplitude limiter, it is further suggested to deduct a constant value from the output value of the acceleration receiver. Since the integrator is adjusted in such a way that it is not capable of transmitting a negative output signal, output signals of the acceleration receiver lying below the threshold voltage have no effect on the output of the integrator.

European patent application EP-A-O 156,930 discloses an apparatus for triggering a restraining system of a motor vehicle upon impact in which an output signal from an acceleration receiver is communicated to an integrator the output signal of which actuates the restraining system as soon as the integrator output signal exceeds the triggering threshold value. A variable integration threshold value is applied to the integrator, and a reference value of the integrator is shifted as a result of the differentiation of the output signal of the threshold value switch. First, the integration threshold value is changed in accordance with a change in the triggering threshold value in order to insure a reliable response and a reliable triggering of the restraining system in response to short input impulses. However, this triggering system does not permit to obtain an early reliable triggering of the passenger protection system at comparatively low acceleration values which occur at an oblique impact.

The aforementioned systems do indeed solve the problem of only registering accelerations which lie above a determined level and a determined time period. But it is a disadvantage in these systems that they do not trigger or trigger late at low accelerations such as occur during an oblique impact, since, due to the deduction of a constant value from the measured acceleration signal, the acceleration value remaining to be integrated leads too late or not at all to an integration value which exceeds the triggering threshold of the system connected downstream of the integrator. Therefore, the present invention is based on an apparatus for triggering passenger protection systems, particularly restraining systems, in vehicles during impact, in which the output signal of an acceleration receiver which is reduced by an amount corresponding to an integration threshold value, or a signal derived from this output signal, is integrated in an integrator, wherein the output signal of the integrator triggers the passenger protection system, possibly via an output stage, as soon as the integrator output signal exceeds a triggering threshold value.

It is the object of the invention to provide measures in such an apparatus which ensure a prompt, secure triggering of the passenger protection system during critical impact processes at comparatively low acceleration values.

SUMMARY OF THE INVENTION

The object of the invention is met, according to the invention, by forming the integration threshold value to be deducted from the measured acceleration signal or from a signal derived from the latter as a variable value. In principle, the invention also consists in that a constant value is no longer deducted from the acceleration value but, rather, the threshold value to be deducted is made to be dependent on the respective situation. This measure makes it possible to overcome the disadvantage that the residual value remaining to be integrated after the deduction of a constant threshold value is very small so that the integration can take a rather long time before the system is finally triggered. At such low acceleration values, it is suggested, rather, to keep the threshold value which is to be deducted extremely small or to set it to zero so that a triggering can be implemented more quickly.

In a further development of the invention, it is suggested to change the integration threshold value as a function of the output signal of the integrator. The automatic adjustment of the threshold value can be handled relatively simply by means of this. It is particularly recommended, in a further development of the invention, that the integration threshold value increases as the output signal of the integrator increases, and vice versa, i.e. when the output value of the integrator is low, the threshold to be deducted is also low. Accordingly, a relatively steep rise of the output signal of the integrator is obtained in the initial phase also at relatively low measured acceleration values, since it is not necessary to wait first until a constant threshold voltage is exceeded with regard to integration. The dependence of the integration threshold value on the output signal of the integrator can run continuously, but can also run in stages in a stepwise manner. Other dependencies are also conceivable.

A particularly simple control of the integration threshold value is obtained when this value follows the output signal of the integrator in a linear manner, wherein there are other suitable possibilities of change with respect to the time lag between the two synchronous signals.

The output signal of the integrator may be fed back indirectly to the input of the integrator via a threshold value transmitter which forms this output signal. A differential element is connected prior to the input of the integrator which deducts the fed-back threshold value from the measured acceleration signal or from a signal derived from this acceleration signal. This threshold value transmitter can feed the integrator output signal back to the input of the integrator with a time delay, but can also more or less distort the integrator output signal. In the event that the time delay is relatively slight and the transmitted threshold value is a reflection of the integrator output signal, an e-function results substantially for the output signal of the integrator, since the value to be deducted from the acceleration input signal becomes increasingly larger until the two values are finally identical to one another and the input value of the integrator changes to zero. However, if a constant value is deducted from the measured acceleration signal, as was suggested, an integration first commences at that moment when the input signal exceeds the constant threshold value. If the acceleration value rises very quickly, the integration signal also rises very quickly. But if the acceleration is relatively low, the differential value to be integrated can remain quite low and the threshold value at the output of the integrator necessary for triggering can accordingly only be reached quite late.

It is recommended that the apparatus, according to the invention, be constituted by electronic components. In so doing, it is not absolutely necessary to effect the resulting control loop by means of returning the output signal of the integrator to its input, rather, the resulting low-pass behavior can also be simulated by means of a differently constructed, preferably electronic circuit with low-pass behavior.

BRIEF DESCRIPTION OF THE DRAWINGS

Additional features and advantages of the present invention will be better understood from the description that follow with reference to appended drawings wherein:

FIG. 1 shows a block-diagram of a prior art an apparatus.

FIG. 2 shows a block-diagram of an apparatus according to the invention,

FIG. 3 shows the curve of the acceleration during a critical impact,

FIG. 4 shows a signal derived from the acceleration, which signal is fed to the integrator input, and FIG. 5 shows the output signal of the integrator.

DESCRIPTION OF THE PREFERRED EMBODIMENT

FIG. 1 shows an apparatus, such as has already been suggested, upon which the invention is based. An acceleration signal be is returned to an acceleration receiver B which transmits a corresponding electrical signal ba to a first input D1 of a differential element D. A constant threshold value is fed to a second input D2 of the differential element D, which threshold value is deducted in the differential element D from the output signal ba of the acceleration receiver B. The differential of the two signals at D1 and D2 forms the input signal ie of the integrator I. As soon as the output signal ia of the integrator I exceeds a determined threshold value, a triggering threshold switch A switches through, the output signal aa of the latter actuating the passenger protection system via an amplifier. In practice, the output signal aa of the triggering threshold switch A can be amplified by the amplifier E and possibly transformed, wherein the output signal ea of the amplifier E then actuates an ignition device which serves to tighten a strap or blow up an air bag. A disadvantage in the system described above is that the input signal ie can become quite small when the difference between D1 and D2 is small. The threshold value aV determined by the triggering threshold switch A is accordingly only exceeded very late by ia, wherein A releases a triggering signal aa at the output of A. Such problems occur particularly when driving into a vehicle traveling in front or during an oblique impact, that is, in cases in which there is a critical impact but the occurring change in velocity is not that high.

FIG. 3 shows a typical curve of the acceleration. It is assumed that the output signal of the acceleration receiver B fed to the differential element D takes a similar course as be (see FIG. 4). As can be seen from FIG. 4, a constant threshold value—4g, which is transmitted by a threshold value transmitter S and fed to the second input D2 of the differential element D, is deducted from ba via the differential element D.

Thus, only the parts of the signal ba lying below the—4g—line participate in a change of the integration signal ia having a course in the positive direction. Circuit measures ensure that ia cannot be negative. In FIG. 5, the course of the signal ia at the output of the integrator I as a function of t is shown as a curve drawn in dashes. At time t1, ba falls below the threshold value—4g, so that ie is greater than zero and the adding commences. At time t5, the integration value ia increases the most, while, at the following time t2, the integration value ia reaches its highest value. Next, ba falls below—4g and ia decreases accordingly until, taken by itself, it would have to pass into the negative area, but this is prevented by measures relating to circuit technology. At time t3, ba again falls below the—4g line, so that ia again adopts positive values which decrease again after t4, since ba exceeds the 4g line again after this point in time.

As can be seen from FIG. 5, it is to be established, as a result, that the threshold value ΔV of the triggering threshold switch, according to FIG. 5, is not reached and accordingly the passenger protection system Z is not triggered, although b repeatedly falls below the threshold value—4g.

FIG. 2 shows the construction, according to the invention, of the apparatus according to FIG. 1. The substantial difference between FIGS. 2 and 1 consists in that the output signal ia of the integrator I is returned to the differential element D via a threshold value transmitter S, so that a threshold value, which is variable with respect to time and is controlled by ai, is present at the second input D2 of the differential element D, which threshold value is deducted from the output signal ha. Investigations have shown that a response behavior of the passenger protection system which is much more favorable than that of the construction according to FIG. 1 can be achieved by means of such a configuration. In particular, the reason for this is that, at smaller negative acceleration values, the full value of ha is also integrated as long as ia is still negligibly small, so that ia approximates the threshold value $\Delta V$ much more quickly than in the construction according to FIG. 1. In addition, the construction according to FIG. 2 is modified relative to the construction according to FIG. 1 to the extent that ia can also achieve negative values. This is important in the event that an impact from the rear results in an impact from the front, for example, in that a vehicle following the secured vehicle pushes the latter against a stationary line of vehicles. In these cases, no threshold value is deducted from the value ha, which is then positive, rather, a threshold value sa with reversed polarity is added, so that an accelerated integration also occurs in this case in the direction of the threshold value $\Delta V$ when the acceleration direction changes. The shape of the solid curve ia prior to time t0 is characteristic of such a behavior. As can be seen, in addition, from FIG. 5, the rise of ia in the circuit arrangement, according to the invention (see solid line in FIG. 5), already commences at time to instead of at time t1 according to the example according to FIG. 1. According to the invention, the threshold value sa follows the signal ia, wherein ha is equally as large as sa at time t6, so that the integration signal has reached a first maximum value. After this, the threshold value signal sa prevails over the modified acceleration signal ha because of the time delay or a corresponding adjustment of the threshold value transmitter S, so that the integration value ia decreases again. The threshold value sa, which drops again later because of the falling value of ai, leads, in connection with an output signal ha which increases again, to a rise of the integration signal until the latter finally exceeds the threshold value $\Delta V$ and accordingly triggers the passenger protection system Z.

Another important change in the circuit arrangement according to FIG. 2, as opposed to FIG. 1, consists in the use of a high-pass filter H which is connected between the acceleration receiver B and the differential element D. This high-pass filter suppresses slow changes in accelerations, e.g. acceleration changes with a frequency below 1 Hz. This step serves, above all else, to suppress more or less sharp braking or acceleration processes which occur during the normal operation of the vehicle, but are uncritical and should not lead to a triggering of the protective system. In the same way, slow changes in the output signal ba due to temperature behavior of the acceleration receiver B can be suppressed by means of the high-pass filter.

If the behavior of the circuit according to FIG. 2, according to the invention, is evaluated mathematically in the sense of control technology, the following function results: $i_1 = \int (h_a - c \cdot i_a) \, dt$, wherein c forms a constant. With the use of the Laplace transform, it follows: $p \cdot i_a = h_a - i_a \cdot c$. This gives the transfer function $$F_{(p)} = \frac{ia}{ha} = \frac{1}{c + p}$$

This is the transfer function of a low-pass filter, so that, very generally, an electrical low-pass filter can be used for the control loop which fulfills the first above-named mathematical function. However, it is not necessary for this low-pass filter to have the construction of the low-pass filter TP shown by means of the dashed border in FIG. 2, rather, very generally, a preferably electrically or electronically operating circuit with the behavior of a low-pass filter can be selected in order to achieve the advantages according to the invention. However, a low-pass filter function can be achieved at considerably less expense than the low-pass filter TP shown in FIG. 2.

The advantage of the invention accordingly consists in that relatively small acceleration signals can already be integrated by means of the integrator. The delayed increase of the threshold value $s_a$ ensures that the output signal of the integrator $i_a$ does not reach the triggering threshold $\Delta V$ during impact at speeds which are too low, e.g. during front end impacts at speeds less than 15 km/h. Since an ia-signal is already present at low accelerations because of the absent constant threshold value, the triggering threshold is reached more quickly as the acceleration signal rises. The restraining device is accordingly activated sooner and an improved protective action is achieved particularly during oblique impacts of vehicles having a less rigid front part (lightweight construction). The acceleration receiver B detects delays as well as accelerations. This is important for correctly evaluating hammer blows and speed changes of the vehicle during the impact, since the vehicle regularly exhibits an oscillating behavior during the impact and since, in addition, a frontal impact is frequently preceded by a shock in the rear of the vehicle. It must also be taken into account that relatively slight delays and accelerations occur during normal operation of the vehicle (in the order of magnitude of $\leq 1.0$ g) which have no effect on the ia-signal. Therefore, this signal is independent from the starting speed of the vehicle, also, additionally, by means of the manner of functioning of the high-pass filter H. The only influencing variable is the acceleration curve during at impact, so that the engine acceleration or the customary braking have no influence on the triggering of the safety system.

It will be understood that each of the elements described above, or two or more together, may also find a useful application in other types of constructions differing from the types described above.

While the invention has been illustrated and described as embodied in an apparatus for triggering passenger safety protection systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An apparatus for triggering passenger protection system, in particular restraining system of motor vehicle upon impact, said apparatus comprising an acceleration receiver for outputting an acceleration signal in response to a vehicle acceleration; differential means having a first input for receiving the acceleration signal, a second input for receiving an integration threshold value signal, and an output for outputting a differential signal; an integrator having an input for receiving the differential signal and an output for outputting a control signal upon receiving the differential signal; a threshold value transmitter for communicating a variable integration threshold value signal to said second input of said differentiation means in response to the control signal; the control signal causing triggering of said protection system when the control signal exceeds a predetermined triggering value.

2. An apparatus according to claim 1, wherein said differential means, said integrator, and said threshold value transmitter form a unit representing a low-pass filter in which said first input of said differential means represents an input of said low pass filter and said output of said integrator represents an output of said low-pass filter.

3. An apparatus according to claim 1, comprising means for outputting a triggering signal for triggering the protection system in response to the control signal exceeding the predetermined triggering value, said triggering signal outputting means including a triggering threshold switch connected with said integrator for receiving the control signal and outputting said triggering signal and an output amplifier connected with said triggering threshold switch for amplifying said triggering signal, said triggering threshold switch having an output which is blocked for an input signal lying below the predetermined triggering threshold value.

4. An apparatus according to claim 1, comprising means for increasing the integration threshold value as the control signal from the integrator increases and for decreasing the integration threshold value as the output signal of the integrator decreases.

5. An apparatus according to claim 1, comprising means for continuously increasing the integration threshold value as the control signal from the integrator increases.

6. An apparatus according to claim 1, comprising means for increasing in steps the integration threshold value as the control signal from the integrator increases.

7. An apparatus according to claim 1, comprising means for enabling the integration threshold value to follow the control signal from the integrator in a linear manner.

* * * * *